United States Patent Office 3,287,396
Patented Nov. 22, 1966

3,287,396
PHENYLDESOXYTHYRONINES
Benjamin Blank, Trevose, and James F. Kerwin, Broomall, Pa., assignors to Smith Kline & French Laboratories, Philadelphia, Pa., a corporation of Pennsylvania
No Drawing. Filed Jan. 11, 1963, Ser. No. 250,763
5 Claims. (Cl. 260—471)

This invention pertains to the novel class of organic compounds which may be represented by the structural formula:

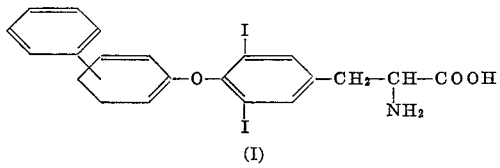

(I)

These compounds, which are 3-[4-(phenylphenoxy)-3,5-diiodophenyl]-alanines or alternatively phenyldesoxythyronines, have striking pharmacodynamic activity and may be employed in increasing the basal metabolic rate in hypothyroid conditions, inhibiting the thyrotropic hormone and decreasing the cholesterol level in blood. These compounds are, to the best of the inventors' knowledge, the first example of desoxythyronine derivatives demonstrating such metabolic activity.

These compounds may be in either the D or L isomeric form as well as the DL racemate and all such forms are envisioned as being within the parameters of this invention.

This invention also includes the nontoxic pharmaceutically acceptable salts of the above-described amino acids, including both those salts wherein the carboxylic acid function is associated with a nontoxic pharmaceutically acceptable cation and those in which the amino function is associated with a pharmaceutically acceptable nontoxic anion. Representative of the above cations are ammonium including lower alkyl ammonium, and alkali metal ions such as potassium, sodium and calcium. Representative of the above anions are chloride, sulfate, ethanedisulfonate and the like. Both types of these salts are prepared by methods well known to the art for other amino acids. Generally, the compounds of this invention may be employed as the Zwitterion form.

The process employed for the preparation of the compounds of this invention may be summarized as follows:

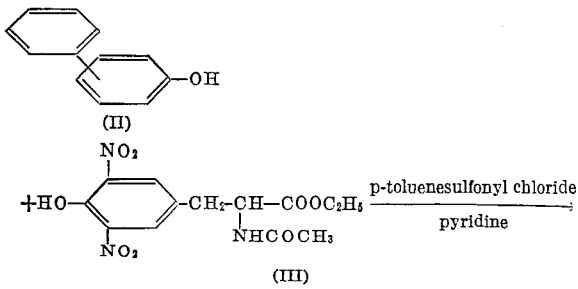

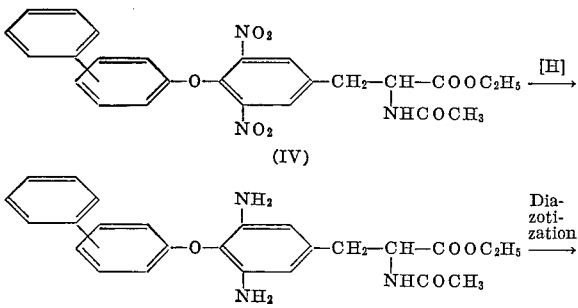

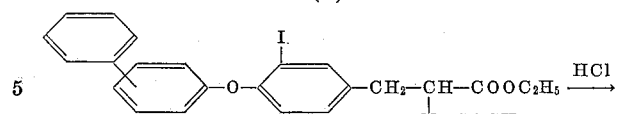

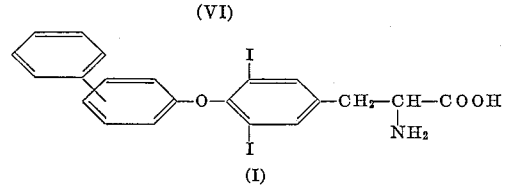

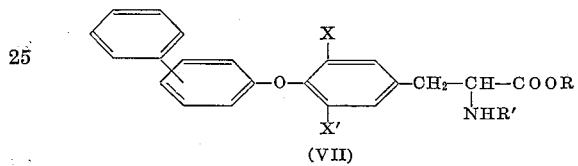

(I)

In the above procedure of N-acetyl group and the ethyl ester group may of course be replaced by other N-lower alkanoyl groups and other lower alkyl ester groups respectively. By the term lower alkyl is meant a hydrocarbon chain of from one to five carbon atoms.

Also embraced within the scope of the present invention are the valuable intermediates of the formula:

(VII)

wherein R is lower alkyl, R' is lower alkanoyl and X and X' are the same being either amino or nitro.

The following examples will serve to further exemplify the nature of this invention but should not be construed as a limitation thereof.

Example 1

A solution of 0.045 mole of the ethyl ester of N-acetyl-3,5-dinitrotyrosine and 0.045 mole of p-toluene-sulfonyl chloride in 100 ml. of pyridine is heated on a steam bath for 20 minutes with stirring. There is then added 0.10 mole of 4-phenylphenol and the resultant solution stirred at reflux for two hours. The pyridine is removed in vacuo and the resultant solid dissolved in chloroform. This chloroform solution is successively washed with dilute hydrochloric acid, water, 10% aqueous sodium hydroxide and again with water. After drying the chloroform solution, the solvent is removed and the residue recrystallized from ethanol to yield N-acetyl-3-[4-(4-phenylphenoxy)-3,5-dinitrophenyl]-alanine ethyl ester, M.P. 144–146° C.
Calc.: C, 60.85; H, 4.70; N, 8.52. Found: C, 61.02; H, 4.99; N, 8.61.

In a similar fashion by employing 3-phenylphenol and 2-phenylphenol there are respectively obtained the compounds N-acetyl-3-[4-(3-phenylphenoxy)3,5-dinitro-phenyl]-alanine ethyl ester, M.P. 140–142° C. and N-acetyl-3-[4-(2-phenylphenoxy)-3,5 - dinitrophenyl] - alanine ethyl ester, M.P. 223–224° C.

Example 2

A solution of 0.015 mole of N-acetyl-3-[4-(4-phenylphenoxy)-3,5-dinitrophenyl]-alanine ethyl ester in 150 ml. of acetic acid is reduced in a Parr apparatus in the presence of 1.5 g. of 10% palladium-on-charcoal under an initial pressure of 3 to 4 atmospheres of hydrogen. When the uptake of hydrogen is complete, the catalyst is removed by filtration and the filtrate added with stirring and cooling to a solution of nitrosyl sulfuric acid (prepared by adding 5.9 g. of sodium nitrite to 125 ml. of sulfuric acid and 50 ml. of acetic acid at 60–70°) at such a rate so as to maintain the temperature at 0–5° C. Upon completion of the addition, the solution is stirred and cooled for an additional hour and then added rapidly with stirring to a mixture of 13.2 g. of sodium iodide, 16.5 g. of iodine and 3.0 g. of urea in 275 ml. of water and 275 ml. of chloroform. Stirring is continued for 2 hours at room temperature and the layers are then separated. The aqueous layer is extracted several times with chloroform and the combined chloroform phases are successively washed with water, a 10% aqueous solution of sodium bisulfite, water, a 5% aqueous solution of sodium bicarbonate and again with water. After drying over calcium chloride, the chloroform solution is distilled and the residue is then recrystallized from 50% aqueous ethanol to yield N-acetyl-3-[4-(4-phenylphenoxy) - 3,5 - diiodophenyl]-alanine ethyl ester, M.P. 170–172° C.

Calc.: C, 45.82; H, 3.54; I, 38.73. Found: C, 45.81; H, 3.75; I, 38.98.

By the above procedure there is similarly obtained N-acetyl-3-[4 - (3 - phenylphenoxy) - 3,5 - diiodophenyl]-alanine ethyl ester, M.P. 149–151° C. and N-acetyl-3-[4-(2-phenylphenoxy)-3,5-diiodophenyl]-alanine ethyl ester, M.P. 172–175° C.

*Example 3*

A suspension of 0.0046 mole of N-acetyl-3-[4-(4-phenylphenoxy)-3,5-diiodophenyl]-alanine ethyl ester in 35 ml. of acetic acid and 35 ml. of hydrochloric acid is heated under reflux with stirring for two hours. At the end of this time the mixture is cooled, diluted with water and adjusted to pH 5 with a 40% aqueous sodium hydroxide solution. The solid is collected by filtration, washed with water and recrystallized from aqueous acetic acid. This solid is added to 25 ml. of acetic acid and 25 ml. of hydrochloric acid and the mixture refluxed for 20 hours. At the end of this time the mixture is cooled and filtered and the solid dried. Recrystallization is then effected from a hot ethanol solution containing a few drops of hydrochloric acid by the addition of hot water and hot 2 N sodium acetate solution to a pH 5 to 6. There is thus obtained the compound 3-[4-(4-phenylphenoxy)-3,5 - diiodophenyl]-alanine, M.P. 239–240° C.

Calc.: C, 41.82; H, 3.18; I, 42.05. Found: C, 41.83; H, 3.04; I, 41.56.

In a similar fashion there is obtained the compounds 3-[4-(3-phenylphenoxy)-3,5-diiodophenyl]-alanine, M.P. 234–236° C. and 3-[4-(2-phenylphenoxy) - 3,5 - diiodophenyl]-alanine, M.P. 215–217° C.

What is claimed is:

1. Compounds of the formula:

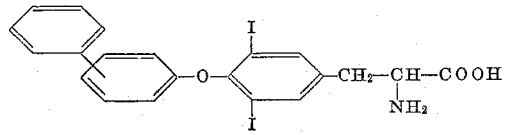

2. 3-[4-(4-phenylphenoxy)-3,5-diiodophenyl]-alanine.
3. 3-[4-(3-phenylphenoxy)-3,5-diiodophenyl]-alanine.
4. 3-[4-(2-phenylphenoxy)-3,5-diiodophenyl]-alanine.
5. Compounds of the formula:

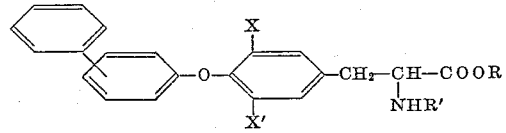

wherein

R is lower alkyl
R' is lower alkanoyl, and
X and X' are the same member selected from the group consisting of amino and nitro.

References Cited by the Examiner

UNITED STATES PATENTS 3,045,041   7/1962   Jorgensen _____ 260—519

LORRAINE A. WEINBERGER, *Primary Examiner.*

D. D. HORWITZ, *Examiner.*